J. W. THROPP.
TIRE MOLD.
APPLICATION FILED JULY 13, 1909.
983,785.
Patented Feb. 7, 1911.
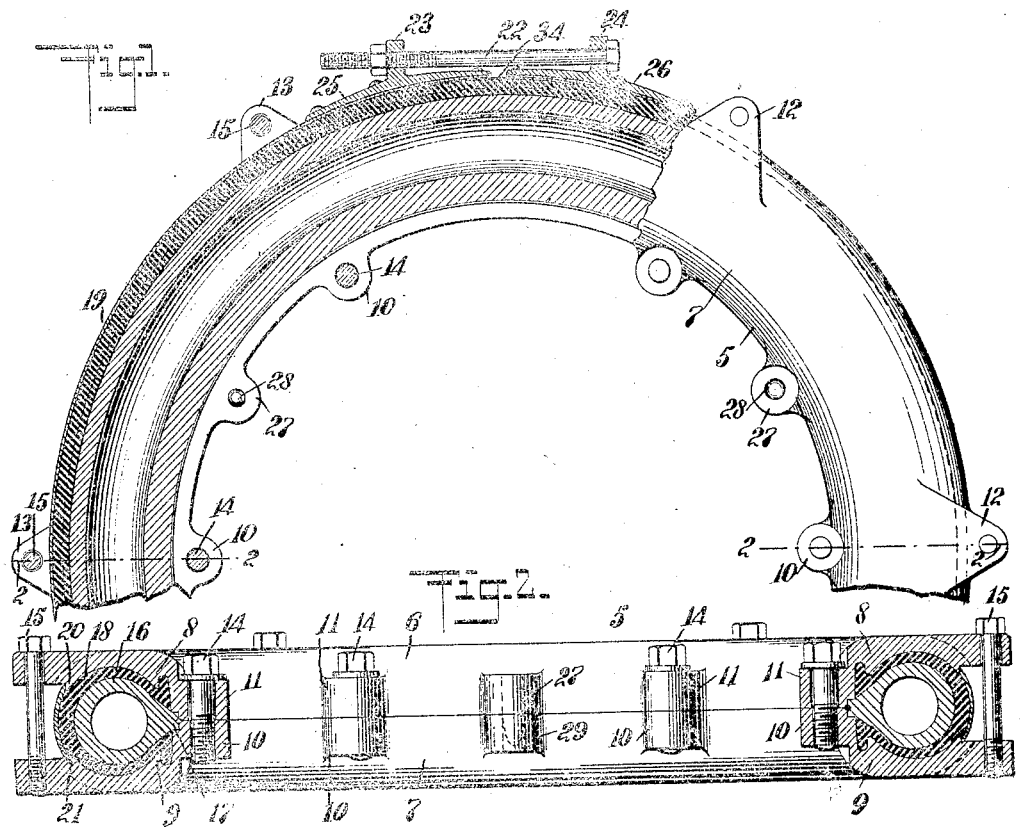
WITNESSES
Ben. Jaffe
H. Whiting
INVENTOR
Joseph W. Thropp
BY
Munn & Co
ATTORNEYS

UNITED STATES PATENT OFFICE.

JOSEPH W. THROPP, OF TRENTON, NEW JERSEY.

TIRE-MOLD.

983,785.    Specification of Letters Patent.    Patented Feb. 7, 1911.

Original application filed March 1, 1909, Serial No. 480,740. Divided and this application filed July 13, 1909. Serial No. 507,324.

*To all whom it may concern:*

Be it known that I, JOSEPH W. THROPP, a citizen of the United States, and a resident of Trenton, in the county of Mercer and State of New Jersey, have invented a new and Improved Tire-Mold, of which the following is a full, clear, and exact description.

This invention relates to a new and improved mold, to be used in curing and vulcanizing the outer casings of pneumatic tires or the like, and is a division of my application Serial No. 480,740, filed March 1, 1909.

The object of this invention is to provide a device which will be simple in construction, efficient in its operation, easily manipulated, inexpensive to manufacture, and at the same time strong and durable.

A further object of this invention is to provide a device which will permit a hard cure of the tire casing at the tread, where there is the greatest amount of wear, and which will permit a soft cure at the sides of the tire casing, where flexibility is necessary.

These and further objects, together with the construction and combination of parts, will be more fully described hereinafter, and particularly set forth in the claims.

Reference is to be had to the accompanying drawings forming a part of this specification, in which similar characters of reference indicate corresponding parts in all the figures, and in which—

Figure 1 is a side view of one form of my device, partly in section to show the underlying construction; Fig. 2 is a transverse section on the line 2—2 in Fig. 1; Fig. 3 is a section, similar to the section shown in Fig. 1, of another form of my device; and Fig. 4 is a transverse section on the line 4—4 in Fig. 3.

Referring more particularly to the separate parts of my device, 5 indicates the mold proper, which is preferably circular in form, and is composed of two members 6 and 7. Each of these members 6 and 7 have inwardly-extending formers 8 and 9, which are adapted to engage in the clencher portion of the tire casing, to aid in forming the same. The two members 6 and 7, of the mold have inwardly-extending perforated lugs 10 and 11, and outwardly-extending lugs 12 and 13, which are adapted to receive tap-bolts 14 and 15, by means of which the members 6 and 7 are secured together. There is also provided a hollow mandrel or core 16, which has an inwardly-extending flange 17 which is adapted to fit in a slot formed by cut-out portions on the facing sides of the members 6 and 7. The tire casing 18 to be secured is inserted between the core 16 and the members 6 and 7 of the mold.

In order to cover the tread of the tire casing 18, there is provided, in the form shown in Figs. 1 and 2, a circular thin metal band 19, which is adapted to abut against shoulders 20 and 21 on the members 6 and 7, and the ends of which are secured together by any suitable means, such as a screw-bolt 22, which engages upwardly-extending lugs 23 and 24 on brackets 25 and 26, which are secured to the ends of the band 19 in any suitable manner. In order to cover the gap left between the ends of the band 19, there is provided a suitable plate 34, which is placed subjacent the ends of the band 19 on the tire casing 18.

In order that the members 6 and 7 of the mold 5 may be placed together in proper relation there are provided a plurality (preferably three) of inwardly-extending flanges 27, which have center pins 28 secured thereto, the latter being adapted to fit in corresponding openings in inwardly-extending flanges 29 on the opposite member 7.

In the form shown in Figs. 3 and 4, in place of the metal band 19, there is provided a plurality of segments 30, preferably three in number, which are formed preferably of cast metal, and are joined together by means of bolts 31, which extend through perforations in outwardly-extending flanges 32 and 33 at the ends of the segments. In each of the segments 30, there are provided openings 34, to allow the bolts 15 to pass. In this form also, as clearly illustrated in Fig. 4, the compressing members, which are in the form of the segments 30, abut against the shoulders 20 and 21 on the mold members 6 and 7.

Having thus described my invention, I claim as new and desire to secure by Letters Patent:—

1. In a mold for tire casings, the combination with a core, of a mold, having a plurality of separable members, each of said members having a shoulder thereon, means for centering said members relative to each other, means for securing said members together, a continuous flexible pressure member adapted to abut against said shoulders, and means for constricting the size of said pressure member.

2. In a mold for tire casings, the combination with a core, of a mold comprising separable members, each of said members having a shoulder thereon, means for centering said members relative to each other, means for securing said members together, a pressure metal band adapted to abut against said shoulder, brackets on the end of said band, and a screw bolt adapted to draw said brackets together.

3. In a mold for tire casings, the combination with a core, of mold members connected together at their inner edges and spaced apart at their outer periphery to form an annular opening, an annular member adapted to close said opening, said annular member having portions thereof adapted to be adjusted relative to each other, and means out of contact with said mold members for adjusting said portions to vary the size of said annular member.

4. In a mold for tire casings, the combination with a core, of mold members connected together at their inner edges and spaced apart at their outer periphery to form an annular opening, an annular member adapted to close said opening, said annular member having portions thereof adapted to be adjusted relative to each other, and a bolt out of contact with said mold members and mechanically connecting said portions, for adjusting said portions of said annular member to vary the size of said annular member.

5. In a mold for tire casings, the combination with a core, of mold members connected together at their inner edges and spaced apart at their outer peripheries to form an annular opening, a mold member adapted to close said opening, said annular member having ends adjustable relative to each other, and a mechanical adjusting device out of contact with said mold members for drawing said ends together.

6. In a mold for tire casings, the combination with a core, of mold members connected together at their inner edges and spaced apart at their outer peripheries to form an annular opening, and a self-contained contractible member adapted to close said opening and having mechanism operative independently of said mold members, for adjusting the size thereof.

In testimony whereof I have signed my name to this specification in the presence of two subscribing witnesses.

JOSEPH W. THROPP.

Witnesses:
 THEODORE R. EARLING,
 ANDREW J. BERRIEN.